US008422504B2

(12) United States Patent  (10) Patent No.: US 8,422,504 B2
Assarpour  (45) Date of Patent: Apr. 16, 2013

(54) NETWORK SWITCH PORT AGGREGATION

(75) Inventor: Hamid Assarpour, Arlington, MA (US)

(73) Assignee: Avaya Inc., Basking Ridge, NJ (US)

( * ) Notice: Subject to any disclaimer, the term of this patent is extended or adjusted under 35 U.S.C. 154(b) by 248 days.

(21) Appl. No.: 12/951,709

(22) Filed: Nov. 22, 2010

(65) Prior Publication Data

US 2012/0127998 A1  May 24, 2012

Related U.S. Application Data

(60) Provisional application No. 61/359,076, filed on Jun. 28, 2010.

(51) Int. Cl.
  *H04L 12/56* (2006.01)
(52) U.S. Cl.
  USPC ........... 370/392; 370/358; 370/360; 710/104; 710/108
(58) Field of Classification Search .................. 370/358, 370/360, 392; 710/104, 108
  See application file for complete search history.

(56) References Cited

U.S. PATENT DOCUMENTS

| 8,213,320 B2* | 7/2012 | Hu et al. ........................ 370/244 |
| 2003/0035425 A1* | 2/2003 | Abdollahi et al. ............. 370/392 |
| 2003/0169748 A1* | 9/2003 | Weyman et al. ............... 370/401 |
| 2009/0109998 A1* | 4/2009 | Vinayagam et al. .......... 370/465 |
| 2010/0302932 A1* | 12/2010 | Himeno et al. ............... 370/216 |
| 2011/0026439 A1* | 2/2011 | Rollins ......................... 370/258 |

* cited by examiner

*Primary Examiner* — Dang Ton
*Assistant Examiner* — Mewale Ambaye
(74) *Attorney, Agent, or Firm* — Anderson Gorecki & Rouille LLP

(57) ABSTRACT

A network switch configures a static forwarding to a packet processor by suppressing packet switching and forwards all traffic received on a group of ports a trunk port for aggregation. A trunk header is overloaded with message classification information for use at the downstream packet processor. Routing logic retrieves the packet classification information and stores the information in control fields that are ignored due to the static forwarding and local switching disablement. The static forwarding forwards the packet, with the appended classification information, to a packet processor via the aggregation port. Packet classification information is indicative of the type of the message traffic and is performed upon packet arrival at the switching device. The packet processor reads the classification information from the overloaded control fields, rather then expending processing resources to determine the classification, and sends the message packet on an ingress port to a switching fabric for further transport.

16 Claims, 7 Drawing Sheets

NETWORK SWITCH PORT AGGREGATION

CROSS REFERENCE TO RELATED APPLICATIONS

The present application claims the benefit of U.S. Provisional Patent Application No. 61/359,076, filed on Jun. 28, 2010, which is incorporated herein by reference in its entirety.

BACKGROUND

Modern network architectures are struggling to keep up with bandwidth demands as user expectations continually increase amid evolving bandwidth hungry applications. Increased routing throughput is sought as high bandwidth transmissions including streaming media, audio and high definition video formats continue to gain popularity. Network service providers therefore seek switching devices that may be interconnected with other conventional switching devices in a cumulative manner to perform parallel routing and switching operations, thus adding to the existing infrastructure, rather then rendering older equipment obsolete. Accordingly, switch providers strive to deliver equipment revisions and enhancements in conformity with existing standards and protocols, such as those promulgated by IEEE and others. Addition of switches therefore introduces faster hardware and processing algorithms that manage increased bandwidth, yet that do not lose interoperability with preexisting standards so that the existing network infrastructure (hardware) may continue to be utilized and enhanced rather than replaced and discarded.

SUMMARY

In a network switching environment, as is typically employed for Internet and other public and private networks, network switching devices (switches) are commonly employed to provide packet switching functions. Such switches are specifically designed to provide local switching based on L2/L3 forwarding, either within a single device or within multiple devices interconnected via mechanisms such as "HiGig" links as disclosed herein. Network switches employ forwarding rules to compute an outgoing port for message traffic (packets) received on an incoming port. An aggregation port designates a static forwarding from one or more (subset) of incoming ports which are directed to the aggregation port, independently of the rules. Aggregation ports may be employed to consolidate multiple switches in a "stacking" arrangement, thus the aggregation port serves as a trunk port, for providing a "trunk" through the stacked switches. Packets directed to the aggregation port via the static forwarding therefore have a trunk header appended for storing control fields. The control fields include a destination module and destination port, to indicate which of the stacked switches and ports the packet is directed.

In a network switch, routing logic is defined by routing, or forwarding, rules indicative of ports to which message traffic is to be switched based on control fields in the message. One set of control fields is invokable for specifying a destination module and destination port of a downstream device. Configurations herein are based, in part, on the observation that the control fields in the trunk header may be disabled and overwritten, or overloaded, with additional information that is simply passed downstream, rather than employed for switching control. In particular, switching devices configured for stackable operation via a trunk port may be employed for static forwarding using trunk header overload as disclosed herein. In one configuration, a so-called XGS switch, marketed commercially by Broadcom Corporation of Irvine, Calif., is a single-chip switching device commonly used to provide packet switching functions, and is configurable with a HiGig port as a trunk port. Other switching devices may be similarly configured.

Unfortunately, conventional approaches to stacked switches suffer from the shortcoming that message classification processing is performed at each switch, and is not stored, packetized, or encapsulated for downstream use. Further, in the static forwarding configuration, the trunk header destination is moot because the output port is already known, and no determination (switching) based on packet values need be performed. Accordingly, configurations herein substantially overcome the above described shortcomings by employing the trunk header field for storing classification information, rather than forwarding information, by disabling routing (control) normally performed based on values in the trunk header.

Suppression of local switching disables the conventional switching and redirection processing based on the classification information and other routing information, and instead directs the ingress message packet to the aggregation port. By forwarding the message packet (message traffic) directly to the aggregation port, computational overhead of conventional routing is avoided. The aggregation port connects to an interconnection port on a packet processor that receives the aggregated packets, hence rendering the overloaded fields unneeded for destination module/port information and thus available for overloading. The packet processor reads the classification information from the control fields, now overloaded with the classification information, rather then expending processing resources to determine the classification information, and sends the message packet on an ingress port to a switching fabric for further transport. In the egress direction, the packet processor identifies the module (switching device) and aggregation port from which the packet emanated, and stores a corresponding value in the control field header, indicative of the switching device and port to which the message packet should be directed at the switching device.

In further detail, in the network switch having a plurality of ports configured for switching message traffic between the ports according to switching logic, the switching logic is conventionally responsive to control fields in a message packet. Disclosed herein is a method of forwarding the packets by first disabling the switching logic in the network switch responsive to predetermined control fields in a message packet, and defining a static forwarding interconnecting a group of ports with an aggregation port on the network switch. The aggregation port forwards all message packets received by the group of ports to a packet processor. The network switch overrides the control fields by storing a packet classification in the control fields, in which the packet classification is for subsequent forwarding of the message packet, such that the control fields are ignored by routing logic because of the disabling of the switching logic.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a non-transitory computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
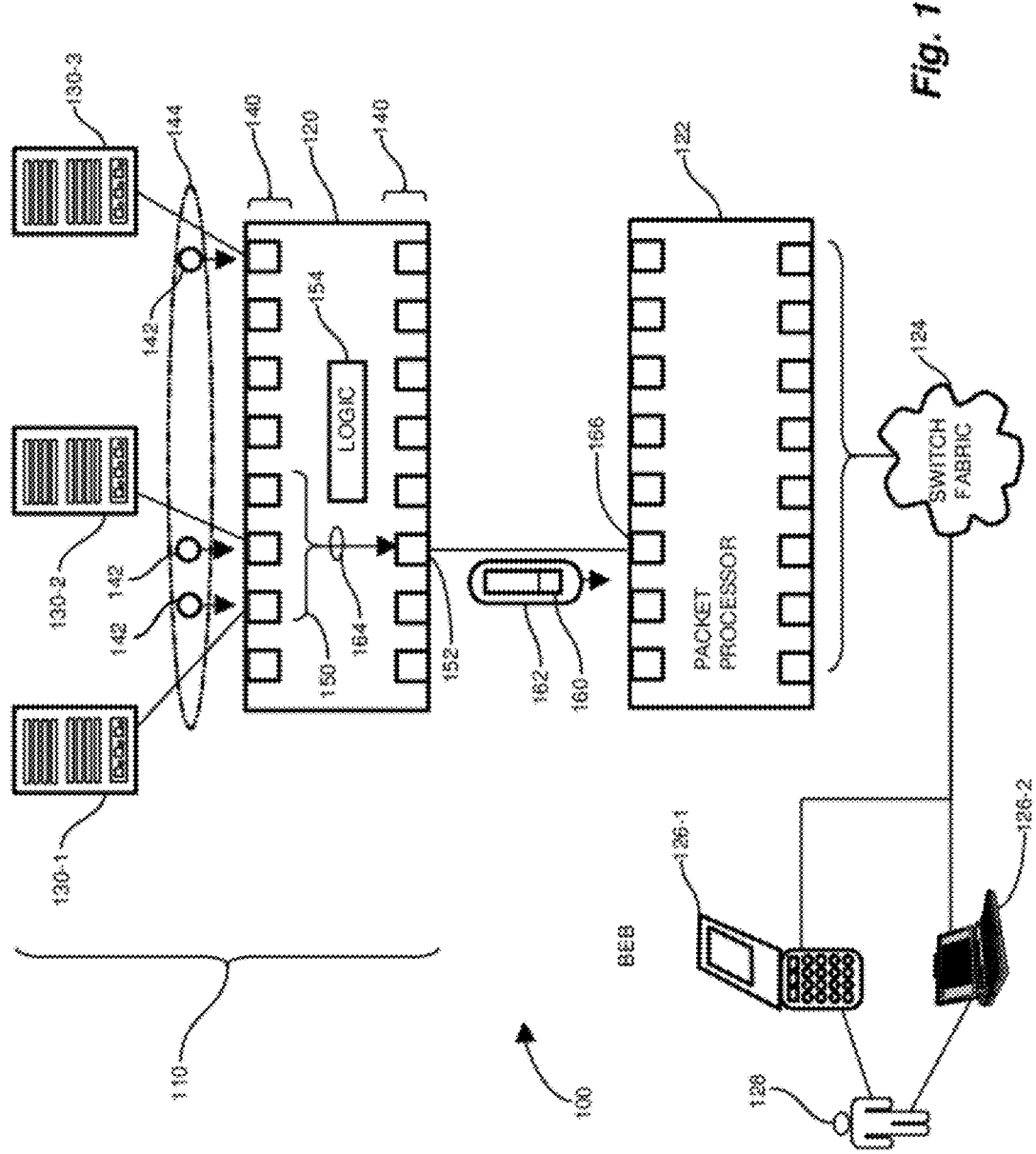
FIG. 1 is a context diagram of a computer networking environment suitable for use with configurations herein.

A network switch such as an XGS or other Ethernet switching device employs an aggregation port defining a static forwarding to a downstream/downpipe switching device. The switch funnels a group of several incoming ports to another switching device (switch) via the aggregation port. The static forwarding suppresses conventional packet switching and associated overhead and instead forwards all traffic received on a predetermined subset, or group, of ports to the aggregation port. The switch overloads a header field in an aggregated packet, normally employed for specifying a destination module (switch) and port, by storing packet classification information to be used by the downpipe device, rather than recomputed at the downpipe device. Routing logic retrieves packet classification information and stores the classification information in control fields that are unneeded and ignored due to configuration of the aggregation port for the static forwarding and local switching disablement. Packet classification information is indicative of the type of the message traffic in the packet and is typically performed upon packet arrival at the switching device. The static forwarding forwards the packet, with the appended classification information, to a packet processor via the aggregation port.

In a network switching environment, it may be desirable to interconnect multiple switches to improve switching performance for providing additional throughput. Interconnection may include so-called "stacking" of the network switches, which defines a subset of ports for connection to another switch. An interconnection port is selected to direct all traffic received on a subset of input ports and direct it downstream to the stacked switch via the interconnection port. The subset of input ports is therefore statically routed to the interconnection port, also called a trunk port, since no forwarding or switching decisions are performed on packets received on the subset of ports. Rather, the packets received on the subset of input ports are simply directed to the interconnection port, and subsequently to the stacked switch. Multiple switches interconnected via dedicated ports therefore "stacks" the switches for additional throughput.

The approach disclosed herein uses the XGS switches in a different model referred to as smart MAC aggregation model. This model defines switching paradigm different from conventional L2/L3 forwarding. This model segregates the traffic into ingress and egress directions. The ingress direction is defined as a packet flow and an I/O port to a designated HiGig port, and the egress direction is defined as a packet flow from a designated HiGig port to an I/O port. Routing logic employs forwarding rules that are typically configured or refreshed at startup, and specify usage of message header fields. Conventional approaches do not segregate the traffic into ingress and egress directions. The switching logic performed by the switch is responsive to the forwarding rules that specify a port as an aggregation port for HiGig, or trunk transport and perform the static forwarding, rather than conventional switching.

In the ingress direction, the XGS switch is divided into one or more static forwarding groups. In each group, a set of I/O ports are configured such that all packets received by any I/O port belonging to the same group are statically forwarded to the designated HiGig port for that group. In addition, all packets received from any I/O port goes through the ingress preclassification pipeline and the result of the preclassification is passed through the Destination Module ID and Destination Port fields within the HiGig Header. In typical XGS usage when multiple switches are interconnected via HiGig ports, the aforementioned HiGig Header fields are used to tell the other switches where to sent the packet. By overloading these fields, the network switch may pass the preclassification tag to a packet processor. The packet processor will use the tag to perform a lookup into a table where the tag is mapped into various information fields which help to offload the packet processor.

In the egress direction, all packets arriving from a HiGig port use the Destination Port ID field in the header to forward the packet to the designated I/O port. The external packet processor makes sure that the packet is sent to the HiGig port where the designated I/O port is within the same forwarding group as the HiGig port. Thus, the packet processor ensures that the egress packets employ the proper port ID to correspond to one of the aggregation group of ports, and the module ID is set as the switch containing the aggregation group.

Message transport in a the stackable network switch having a plurality of bi-directional ports and configured with forwarding rules as described above, in which the ports interconnect to other ports on the switch based on packet classification and the forwarding rules, includes defining a set of ports on the switch as a group, and disabling local switching for at least the group of ports, in which local switching is for applying the forwarding rules to message traffic received on the ports. The network switch designates an aggregation port of the plurality of ports as a static forwarding destination for the group of ports. The network switch configured in this manner performs packet classification on message traffic received on ports of the group of ports, in which the packet classification determines routing information for a packet. The network switch stores the packet classification in a header field of the packet, such that the header field is ignored as control information by the switch from disabling of local switching. The switch sends the packet with the stored packet classification to the packet processor, in which the packet processor is configured to retrieve the packet classification for subsequent forwarding.

FIG. 1 is a context diagram of a computer networking environment suitable for use with configurations herein. Referring to FIG. 1, the environment 100 includes a plurality of network switches 110. At least one of the network switches 110 is an aggregation switch 120 connected to other network switches 130-1 . . . 130-3 (130 generally). The aggregation switch 120 also connects to a packet processor 122 and a switch fabric 124, which in turn connects a user device 126-1, 126-2 (126 generally) for providing computing services to an end user 128.

Each of the switches 120 and 130 includes a plurality of ports 140 for connection to other switches 130 or network devices, such as routers, hubs and bridges, to name several. The aggregation switch 120 defines a group of ports 150 as an aggregation group (group) for static forwarding to an aggregation port 152. The aggregation port 152 receives all message traffic 142 sent to the group 150 from connections 144 from other switches 130. Switching logic 154 in the aggregation switch 120 directs all the traffic 142 to the aggregation port 152 without performing destination lookups and redirection performed on routed (rather than aggregated) message traffic, thus providing an efficient manner to interconnect the aggregation port 152 to other devices such as packet processor 122 as a trunk for distributing switching resources among several switches 130, thus the aggregation port 152 may also be referred to as a trunk port. The aggregation port 152 thus connects to a designated interconnection port 166 at the packet processor 122 for subsequent delivery of aggregated message traffic 162.

Figure 2:
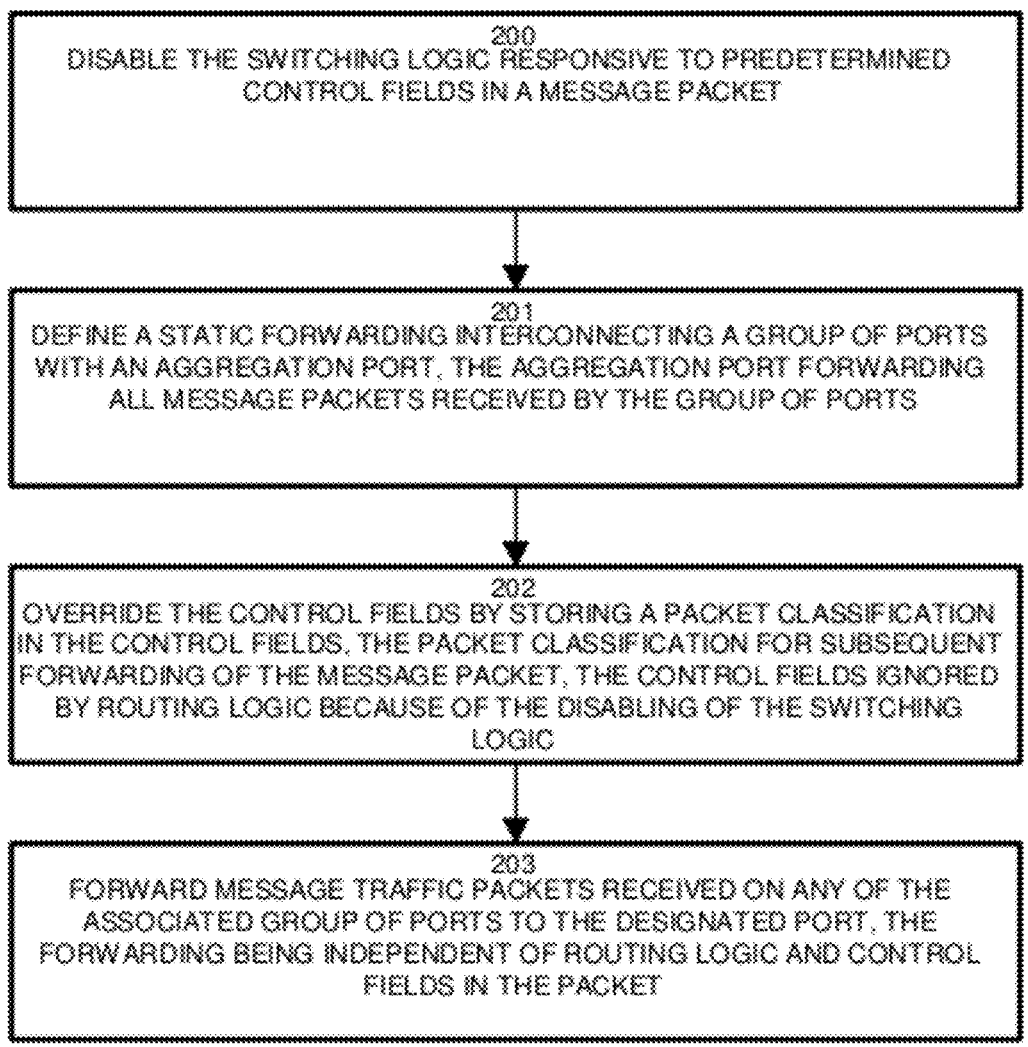
FIG. 2 is a flowchart of port aggregation in the environment of FIG. 1

FIG. 2 is a flowchart of port aggregation in the environment of FIG. 1. Referring to FIGS. 1 and 2, the network switch 120 has a plurality of ports 140 configured for switching message traffic between the ports 140 according to switching logic 154, such that the switching logic 154 is responsive to control fields in the message packets 142. The switch 120 disables the switching logic 154 responsive to predetermined control fields in a message packet 142, as depicted at step 200, for traffic received on the group of ports 150. The switching logic 154 defines a static forwarding 164 interconnecting the group of ports 150 with an aggregation port 152, such that the aggregation port 152 forwards all message packets 142 received by the group of ports 150, as depicted at step 201. While conventional routing operations examine a destination field in a packet 142 and lookup an output port 140 based on a routing table, the static forwarding 164 directs all traffic to the aggregation port 152 independently of the destination field in the packets 142. The switch 120 overrides control fields by storing a packet classification in the control fields 160, in which the packet classification is employed for subsequent forwarding of the message packet 162, as discussed further below. The control fields 160 may be overloaded (overwritten) without disrupting packet flow as they are ignored because of the disabling of the local switching logic 154, as disclosed at step 202. The switch 120 forwards message traffic packets 142 received on any of the associated group 150 of ports to the designated port 166, in which the forwarding is independent of forwarding rules and control fields in the packet 142, as disclosed at step 203. The aggregation port 152 connects to an interconnection port 166 on the packet processor 122, and therefore receives all packets 142 arriving on the ingress group 150 of ports.

Figure 3:
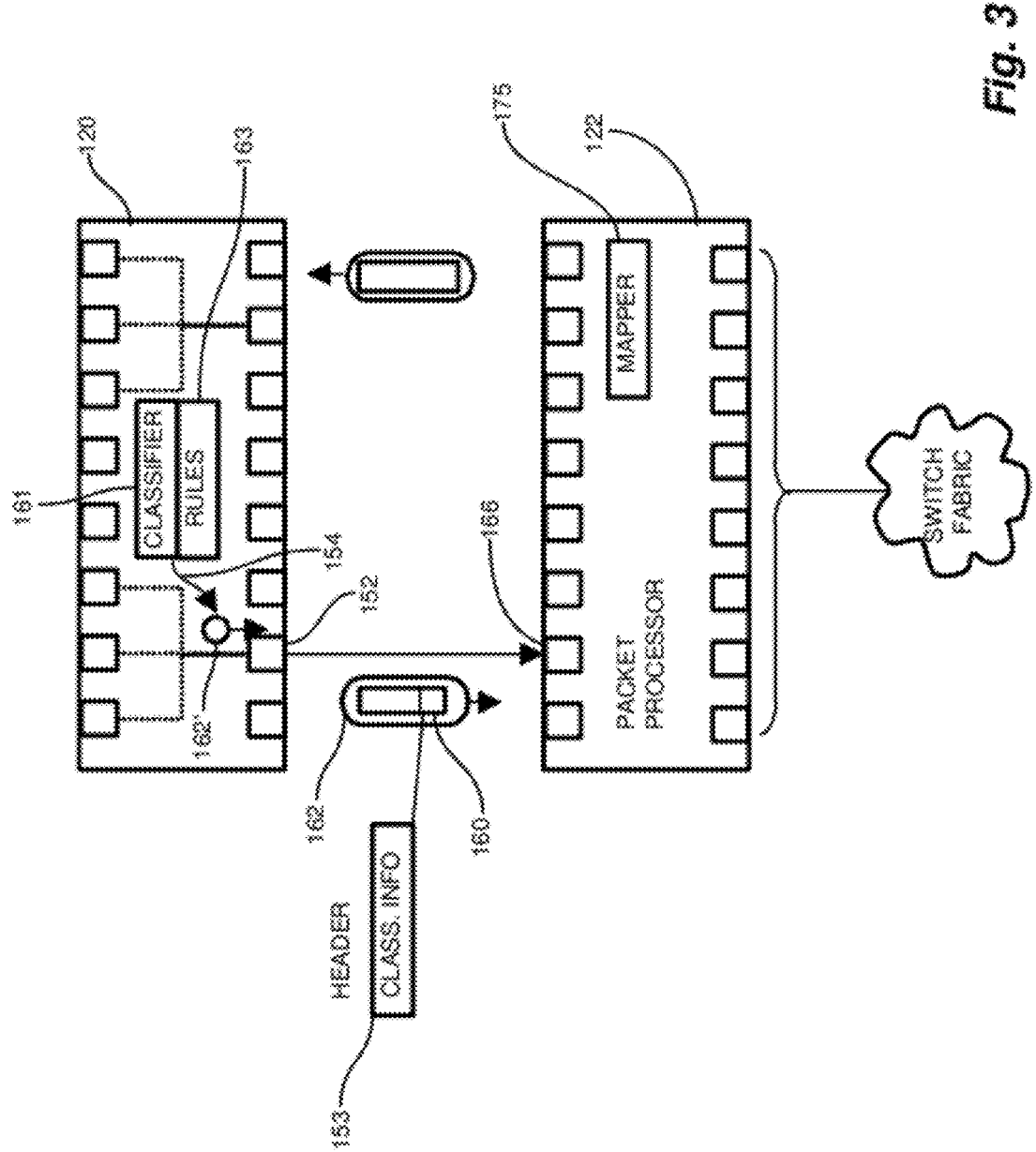
FIG. 3 is a diagram of ingress packet flow in the environment of FIG. 1.

FIG. 3 is a diagram of ingress packet flow in the environment of FIG. 1. Referring to FIGS. 1-3, in an ingress direction (ingress referring to packet flow to an aggregation, or HiGig, port 166), the aggregation switch 120 directs all packets 142 (message traffic) received on the group 150 of ports to the aggregation port 152 for transmission to a downstream node such as packet processor 122. A classifier 161 examines incoming packets 142 to compute classification information for the packet 142, such as protocol, payload size and type of data, to be used in successive forwarding decisions. Forwarding rulesForwarding rules 163 designate the group of ports 150 as statically routed, or switched, to the aggregation port 152. The forwarding rules 163 also disable local switching for traffic received on the group 150, so that the ingress packets 142 are not switched onto another port based 140 on control information in the packet.

The forwarding rules 163 also configure the aggregation port 152 as a so-called HiGig, or trunk port, meaning that it is responsive to high bandwidth volume for directing message traffic 142 to another downstream router. Such a configuration also allows appendage of a HiGig header 160 onto the message packet 142. The HiGig header 160 is incorporated to permit storing a destination module and destination port indicative of a successive switch and port identification to allow for a stacking arrangement of multiple switches 120, 130. Configurations herein overload the header 160 by storing the classification information 153 into the statically switched packet 162', as shown by arrow 154. Storing the classification information relieves downstream nodes from recomputing the same information. Further, since the overridden message packet 162 is directed to the packet processor 122 via the interconnection port 166 for subsequent delivery employing the message classification 153.

Figure 4:
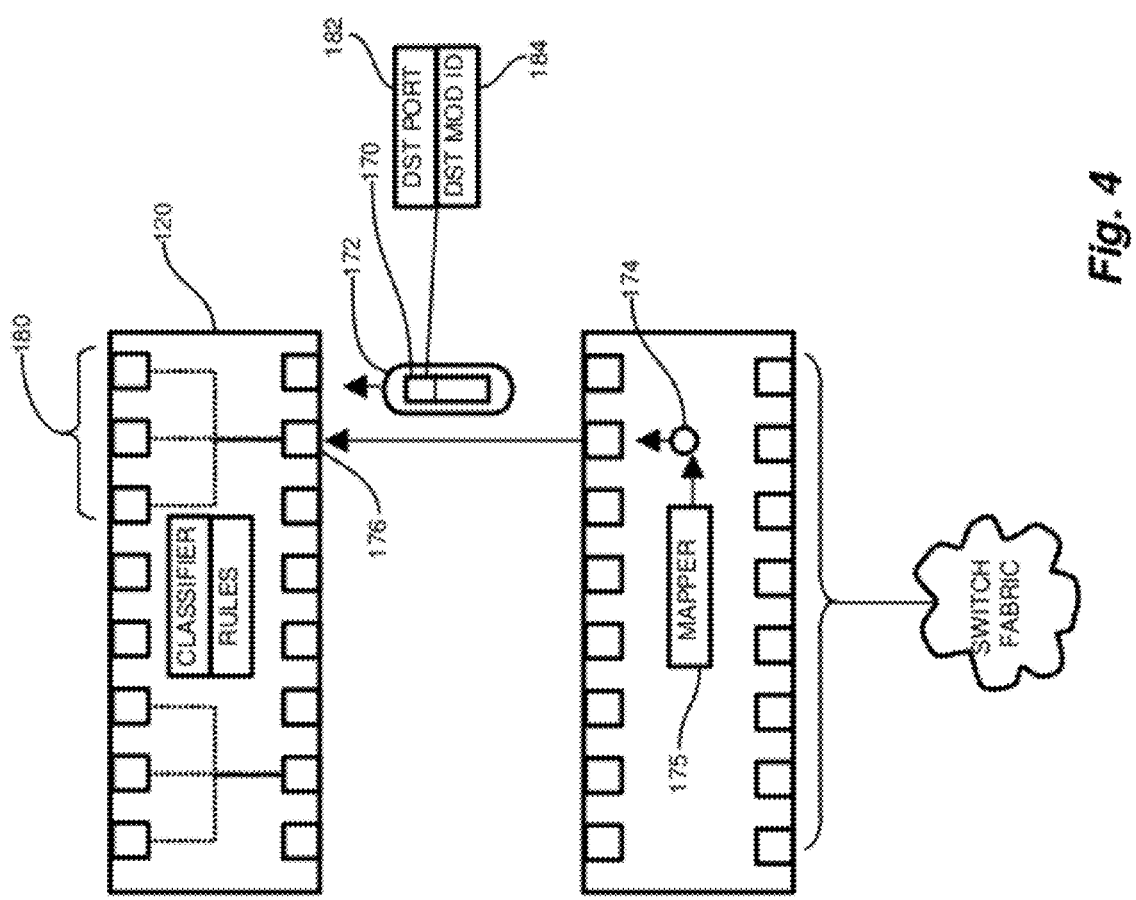
FIG. 4 is a diagram of egress packet flow in the environment of FIG. 1.

FIG. 4 is a diagram of egress packet flow in the environment of FIG. 1, and complements the ingress flow of FIG. 3. Referring to FIGS. 3 and 4, an egress packet (from the HiGig port in the aggregation switch 120) 172 receives header information 174 from a mapper 175 for appending to the HiGig header 170 in the egress packet 172. As with the ingress direction in FIG. 3, an aggregation port 176 accommodates the header 170 including the destination port 182 and destination module 184. In the egress direction, rather than overloading the header 170, the mapper 175 stores the corresponding switch (120, in this case) and port to correspond to the proper port 180 to which the packet 172 should be routed. The mapper 175 may identify this information from the corresponding ingress packet 162 or other suitable mechanism. Since the destination switch 120 is known, the mapper 175 stores the destination switch 120 as the destination module ID 184, and stores the corresponding port of the group 180 as the destination port 182.

Figure 5:
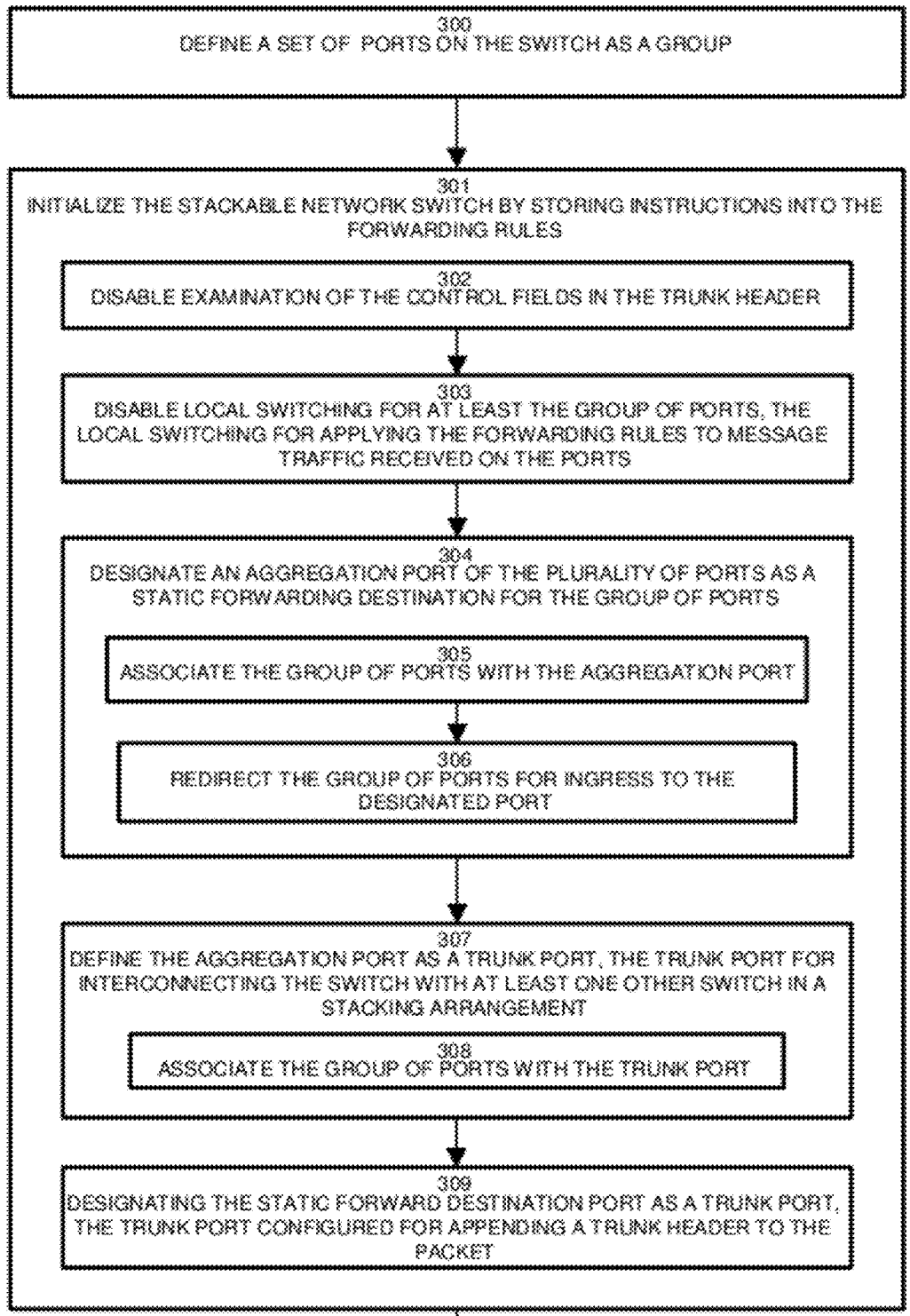
FIGS. 5-7 are a flowchart of packet flow as in FIGS. 3 and 4.
Figure 6:
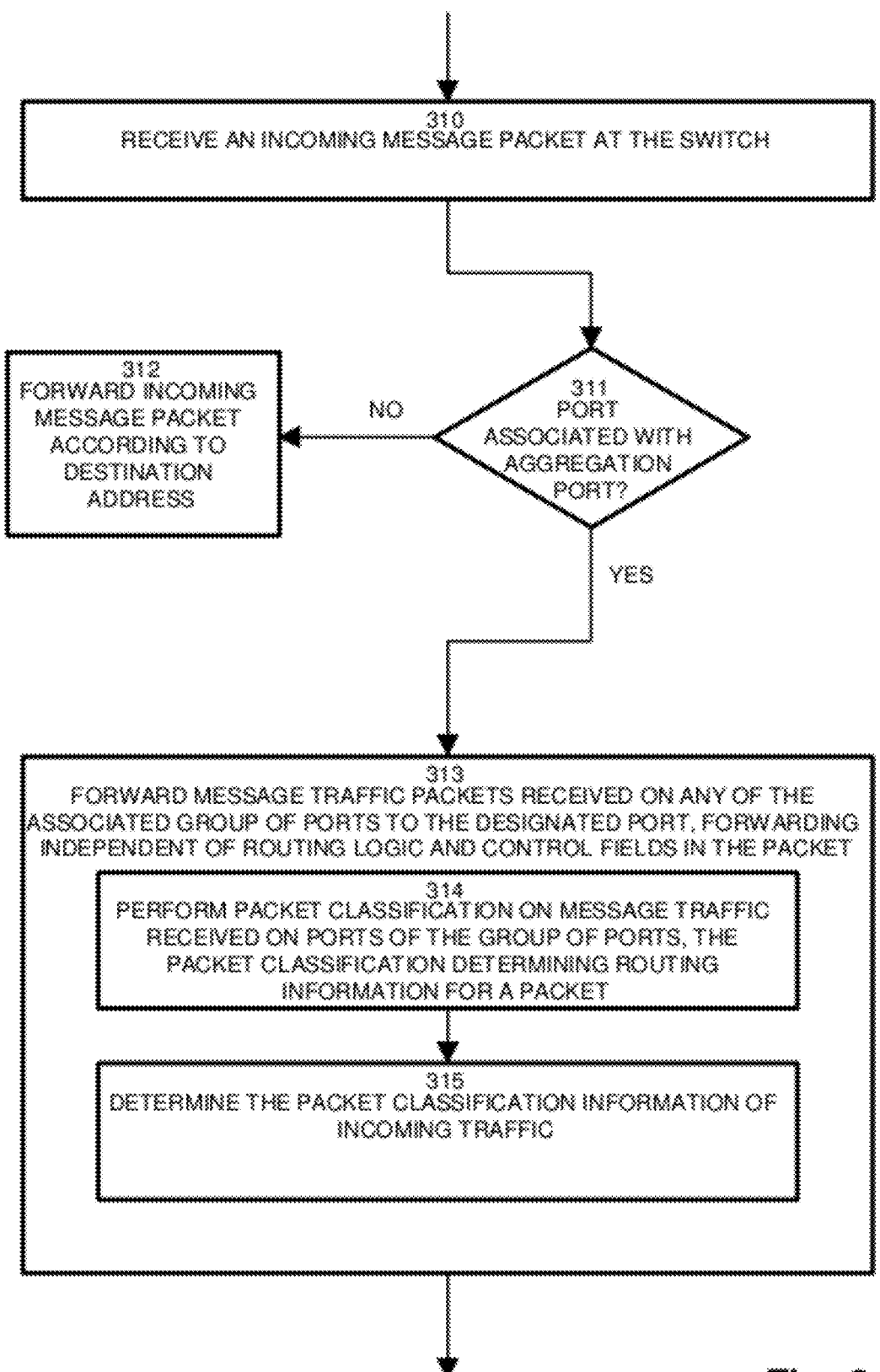
Figure 7:
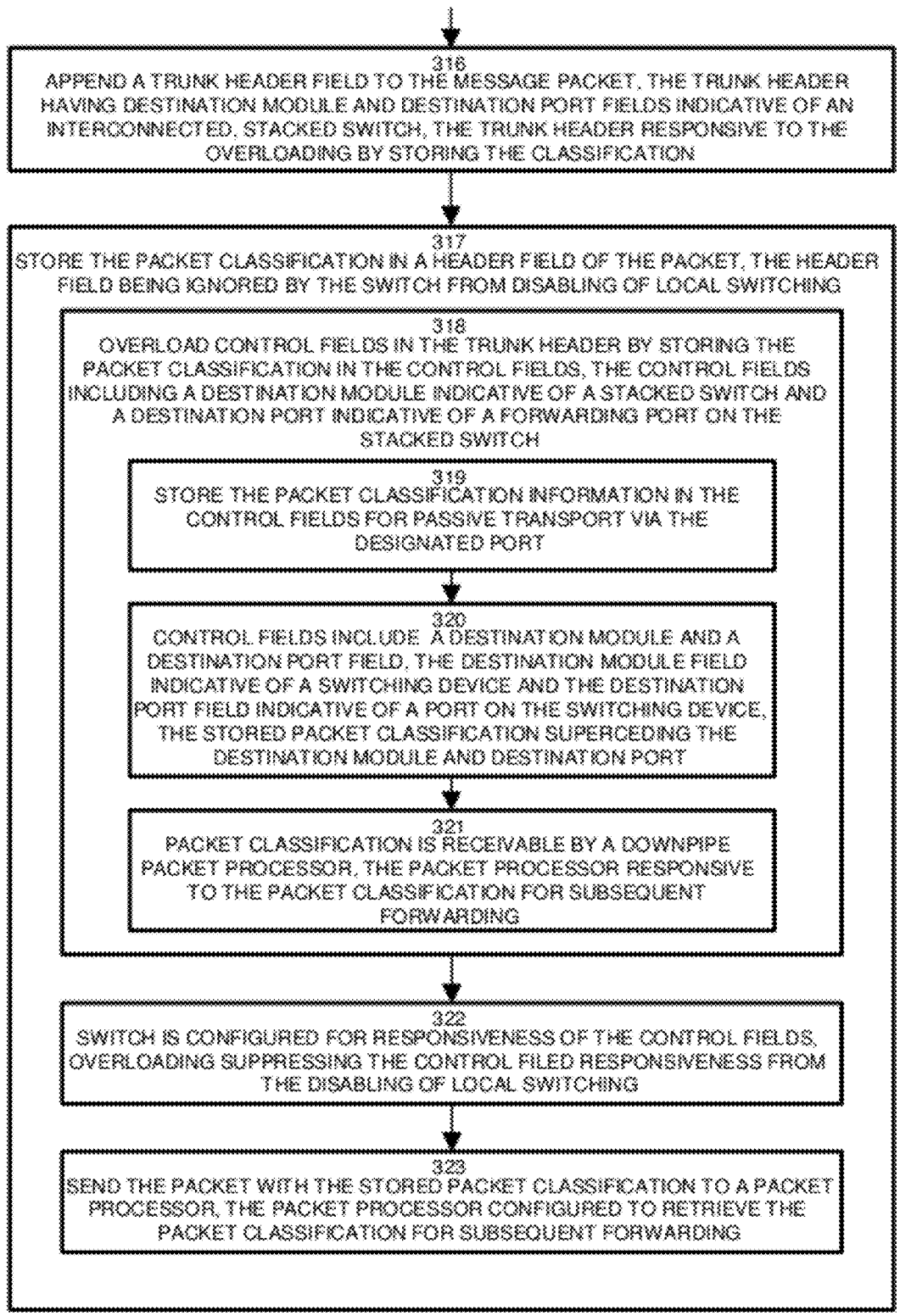

FIGS. 5-7 are a flowchart of packet flow as in FIGS. 3 and 4. Referring to FIGS. 3-7, the method of message transport in a stackable network switch having a plurality of bi-directional ports and configurable forwarding rules 163, in which the ports 140 interconnect to other ports 140 on the switch 120 based on packet classification and the forwarding rules 163 includes, at step 300, defining a set of ports 140 on the switch 120 as a group 150, 180. The group may be an ingress group 150 (i.e. toward the packet processor 122) or an egress group 180 (away from the packet processor 122).

Typical switches perform message classification and forwarding on incoming packets based on the forwarding rules 163. Configurations herein initialize the stackable network switch 120 by storing instructions into the forwarding rules 163, as depicted at step 301, in which the instructions are for disabling examination of the control fields in the trunk header 160, as shown at step 302. The stackable switch 120 disables local switching for at least the group of ports 150, as depicted at step 303, in which the local switching applies the forwarding rules 163 to message traffic 142 received on the ports 140, thus suppressing switching or manipulation based on destination fields in the packets 142 received on any of the group of ports 150. The switch 120 designates the aggregation port 152 of the plurality of ports 140 as a static forwarding destination for the group of ports 150, as shown at step 304. The static forwarding 164 thus determines a static forwarding destination on the packet processor 122, as shown at step 305, by associating the group of ports 150 with the aggregation port 152. This redirects the group of ports 150 for ingress to the designated port 166 at the packet processor 122, as depicted at step 306.

The switch 120 defines the aggregation port 152 as a trunk port, in which the trunk port is for interconnecting the switch 120 with at least one other switch or device 122 in a stacking arrangement, as shown at step 307, thus associating the group of ports 150 with the trunk port, as depicted at step 308. By designating the static forward destination port (interconnection port 166) as a trunk port, the trunk port is configured for appending a trunk header to the packet, as disclosed at step 309. The designation of the aggregation port 152 as a trunk port for stacking other switches permits the addition of a trunk header 160 onto the statically forwarded packet 162.

Once configuring the aggregation port 152 as above, the switch 120 is operable (by configuration) to receive message traffic 142 for overloading. Accordingly, the switch 120 receives an incoming message packet 142, as disclosed at step 310. A check is performed, as depicted at step 311, to determine if the receiving port 140 is a member of the group 150 associated with the aggregation port 150, and thus defined as a HiGig static forwarding. If the port 140 is not one of the group 150, then the switch forwards the incoming message packet 142 according to the destination address for conventional routing, as disclosed at step 312. Otherwise, the switch 120 forwards message traffic packets 142 received on any of the associated group 150 of ports to the designated port 166, such that forwarding is independent of routing logic and control fields in the packet 142, as depicted at step 313. As with all packets received at the switch 120, the classifier 161 performs packet classification on the message traffic 142 received on ports of the group of ports 150, such that the packet classification determines routing information for a packet, as shown at step 314. The switch therefore determines the packet classification information of incoming traffic 142, as depicted at step 315, and appends the trunk header field 160 to the message packet 162, in which that the trunk header has destination module and destination port fields indicative of an interconnected, stacked switch, such that the trunk header 160 is responsive to the overloading by storing the classification information 153, as depicted at step 316.

Following classification (which it typically performed upon receipt of any packet 142), the classifier 161 stores the packet classification 153 in a header field 160 of the packet 162', in which the header field is ignored by the switch 120 from disabling of local switching as depicted at step 317. Storing includes overloading the control fields in the trunk header 160 by storing the packet classification 153 in the control fields 160, in which the control fields include a destination module indicative of a stacked switch and a destination port indicative of a forwarding port on the stacked switch, as shown at step 318, employed when the header is employed in a conventional stacking/trunking arrangement. The switch 120 stores the packet classification information 153 in the control fields for passive transport via the aggregation port 152 to the designated port 166 (interconnection port on the packet processor 122), as depicted at step 319. The overloaded control fields 160 include a destination module and a destination port field, such that the destination module field is typically indicative of a switching device and the destination port field indicative of a port on the switching device, in which the stored packet classification 153 supercedes the destination module and destination port, as shown at step 320. The resulting packet classification is receivable by a downpipe packet processor 122, such that the packet processor responsive to the packet classification 153 for subsequent forwarding, as shown at step 321. The network switch 120 thus remains configured for responsiveness of the control fields, while the overloading suppresses the control filed responsiveness from the disabling of local switching, as shown at step 322. Such overloading is benign in that it does not interfere with normal or desired switch operation due to the configuration of the aggregation port 152 to the interconnect port 166 on the packet processor, forming a symbiotic arrangement. The aggregation port 152, being connected or "hard wired" to the interconnect port 166, then sends the packet 162 with the stored packet classification to the packet processor 122, in which the packet processor is configured to retrieve the packet classification 153 for subsequent forwarding, as depicted at step 323.

Those skilled in the art should readily appreciate that the programs and methods for network switch port aggregation as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method of network switch port aggregation has been particularly shown and described with references to embodiments thereof, it will be understood by those skilled in the art that various changes in form and details may be made therein without departing from the scope of the invention encompassed by the appended claims.

What is claimed is:

1. In a network switch having a plurality of ports configured for switching message traffic between the ports according to switching logic, the switching logic responsive to control fields in a message packet, a method of forwarding packets comprising: disabling the switching logic responsive to predetermined control fields in a message packet; defining a static forwarding interconnecting a group of ports with an aggregation port, the aggregation port forwarding all message packets received by the group of ports; overriding the control fields by storing a packet classification in the control fields, the packet classification for subsequent routing of the message packet, the control fields ignored by routing logic because of the disabling of the switching logic; wherein the control field include a destination module and a destination port field, the destination module field indicative of a switching device and the destination port field indicative of a port on the switching device, the stored packet classification superseding the destination module and destination port; and initializing the stackable network switch by storing instructions into the forwarding rules, the instructions for: disabling examination of the control fields in the trunk header; redirecting the group of ports for ingress to the designated port; determining the packet classification information of incoming traffic; and storing the packet classification information in the control fields for passive transport via the designated port.

2. The method of claim 1 wherein the static forwarding determines a static forwarding destination, further comprising: associating the group of ports with the aggregation port; and forwarding message traffic packets received on any of the associated group of ports to a designated port defined by the static forwarding destination, the forwarding being independent of routing logic and control fields in the packet.

3. The method of claim 2 further comprising defining the aggregation port as a trunk port, the trunk port for interconnecting the switch with at least one other switch in a stacking arrangement; and appending a trunk header field to the message packet, the trunk header having destination module and destination port fields indicative of an interconnected, stacked switch, the trunk header responsive to the overloading by storing the classification.

4. The method of claim 3 wherein the switch is configured for responsiveness of the control fields, overloading suppressing the control filed responsiveness from the disabling of local switching.

5. The method of claim 1 further comprising designating the aggregation port as a trunk port, the trunk port configured for appending a trunk header to the packet for storing the control fields.

6. The method of claim 5 further comprising overloading control fields in the trunk header by storing the packet classification in the control fields, the control fields including a destination module indicative of a stacked switch and a destination port indicative of a forwarding port on the stacked switch.

7. The method of claim 6 wherein the packet classification is receivable by a downpipe packet processor, the packet processor responsive to the packet classification for subsequent forwarding.

8. A network switch having a plurality of ports configured for switching message traffic between the ports according to switching logic, the switching logic responsive to control fields in a message packet, a method of forwarding packets comprising: switching logic responsive to predetermined control fields in a message packet, the control fields responsive to selective disablement for a static forwarding; an interface to the switching logic for defining the static forwarding interconnecting a group of ports with an aggregation port, the aggregation port forwarding all message packets received by the group of ports, the interface further configured for overriding the control fields by storing a packet classification in the control fields, the packet classification for subsequent forwarding of the message packet, the control fields ignored by routing logic because of the disabling of the local switching wherein the control field include a destination module and a destination port field, the destination module field indicative of a switching device and the destination port field indicative of a port on the switching device, the stored packet classification superseding the destination module and destination port; and instructions for initializing the stackable network switch by storing instructions into the forwarding rules, the instructions configured to: disable examination of the control fields in the trunk header; redirect the group of ports for ingress to the designated port; determine the packet classification information of incoming traffic; and store the packet classification information in the control fields for passive transport via the designated port.

9. The network switch of claim 8 wherein the static forwarding determines a static forwarding destination, the static forwarding configured to: associate the group of ports with the aggregation port; and forward message traffic packets received on any of the associated group of ports to a designated port defined by the static forwarding destination, the forwarding being independent of routing logic and control fields in the packet.

10. The network switch of claim 9 wherein the static forwarding is further configured to: define the aggregation port as a trunk port, the trunk port for interconnecting the switch with at least one other switch in a stacking arrangement; and append a trunk header field to the message packet, the trunk header having destination module and destination port fields indicative of an interconnected, stacked switch, the trunk header responsive to the overriding by storing the classification.

11. The network switch of claim 10 wherein the switch is configured for responsiveness of the control fields, overriding suppressing the control filed responsiveness from the disabling of local switching.

12. The network switch of claim 8 wherein the switching logic is further configured to: designate the aggregation port as a trunk port, the trunk port configured for appending a trunk header to the packet for storing the control fields; and overload control fields in the trunk header by storing the packet classification in the control fields, the control fields including a destination module indicative of a stacked switch and a destination port indicative of a forwarding port on the stacked switch.

13. A set of processor based instructions encoded on a non-transitory computer readable storage medium for performing a method of message transport in a stackable network switch having a plurality of bi-directional ports and configurable forwarding rules, the ports interconnecting to other ports on the switch based on packet classification and the forwarding rules, the method comprising: defining a set of ports on the switch as a group; disabling local switching for at least the group of ports, the local switching for applying the forwarding rules to message traffic received on the ports; designating an aggregation port of the plurality of ports as a static forwarding destination for the group of ports; performing packet classification on message traffic received on ports of the group of ports, the packet classification determining routing information for a packet; storing the packet classification in a header field of the packet, the header field being ignored by the switch from disabling of local switching; and sending the packet with the stored packet classification to a packet processor, the packet processor configured to retrieve the packet classification for subsequent routing, wherein the stored packet classification superseding destination module and destination port of control fields in the packet; and initializing the stackable network switch by storing instructions into the forwarding rules, the instructions for: disabling examination of the control fields in the trunk header; redirecting the group of ports for ingress to the designated port; determining the packet classification information of incoming traffic; and storing the packet classification information in the control fields for passive transport via the designated port.

14. The method of claim 13 wherein designating the static forwarding destination further comprises: designating the static forward destination port as a trunk port, the trunk port configured for appending a trunk header to the packet; associating the group of ports with the trunk port; and forwarding message traffic packets received on any of the associated group of ports to the designated port, forwarding independent of routing logic and control fields in the packet.

15. The method of claim 14 further comprising overloading control fields in the trunk header by storing the packet classification in the control fields, the control fields including a destination module indicative of a stacked switch and a destination port indicative of a forwarding port on the stacked switch.

16. The method of claim 13 further comprising: defining the aggregation port as a trunk port, the trunk port for interconnecting the switch with at least one other switch in a stacking arrangement; and appending a trunk header field to the message packet, the trunk header having destination module and destination port fields indicative of an interconnected, stacked switch, the trunk header responsive to the overloading by storing the classification.

\* \* \* \* \*